Dec. 18, 1956  C. W. HURLEY  2,774,507
SEALING DISC CLOSURE
Filed Dec. 10, 1954  2 Sheets-Sheet 1
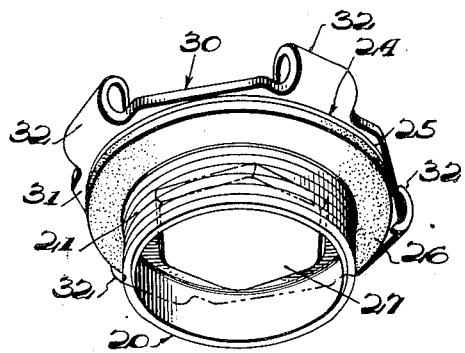
FIG. 2.
FIG. 1.
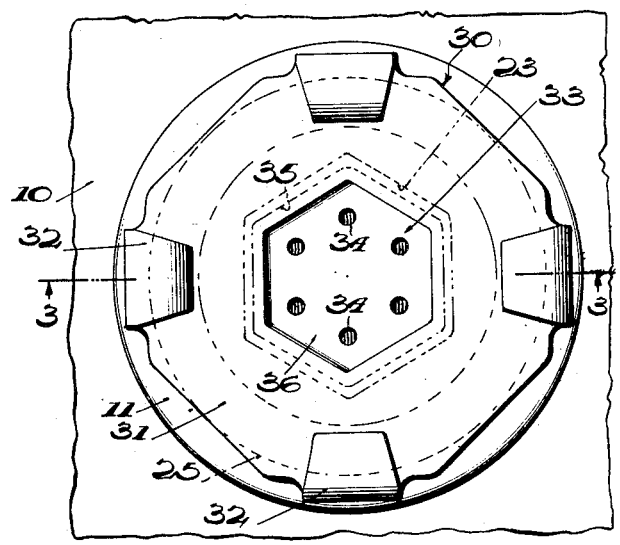
FIG. 3.
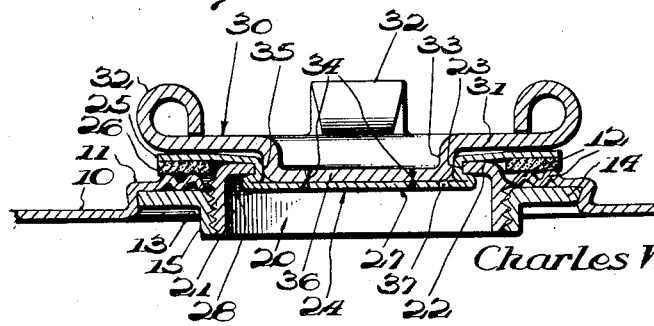
INVENTOR
Charles Warren Hurley
BY
W. J. Eccleston,
ATTORNEY Dec. 18, 1956 C. W. HURLEY 2,774,507
SEALING DISC CLOSURE
Filed Dec. 10, 1954 2 Sheets-Sheet 2
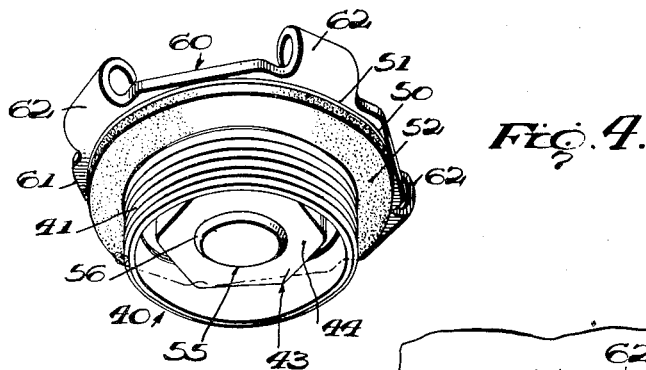
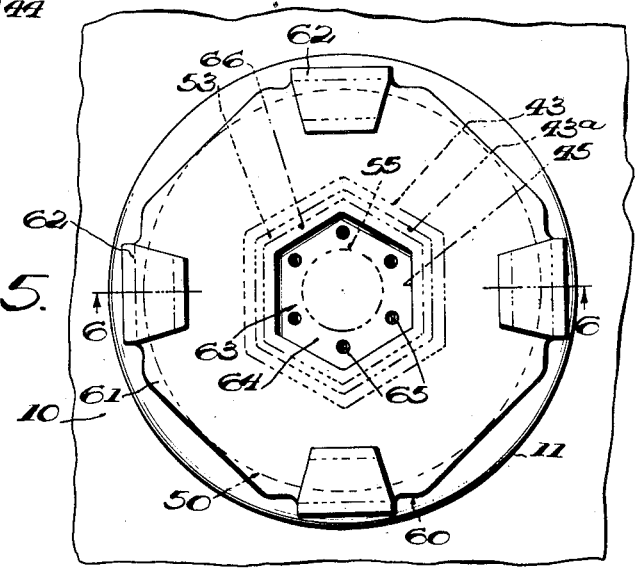
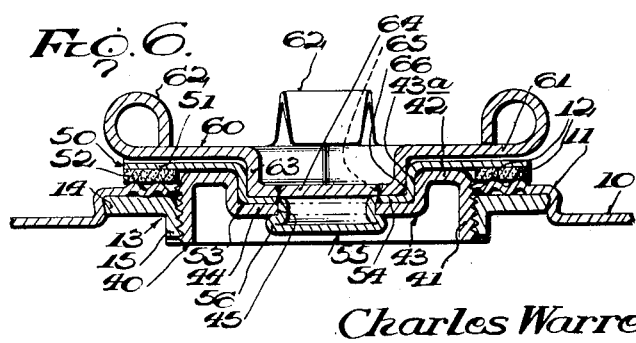
INVENTOR
*Charles Warren Hurley*
BY
*W. J. Eccleston,*
ATTORNEY

United States Patent Office 2,774,507
Patented Dec. 18, 1956

2,774,507

SEALING DISC CLOSURE

Charles Warren Hurley, Gaithersburg, Md., assignor to the United States of America as represented by the Secretary of the Army Application December 10, 1954, Serial No. 474,629

13 Claims. (Cl. 220—39)

The invention relates to container closures and more particularly to screw threaded or like closure plugs or caps for metal drums or the like.

In the conventional metal drum, a threaded flange or sput defines an opening and is fixed in a generally annular embossment formed in the head or a wall of the drum. A sealing washer or gasket is carried by the closure plug or cap and is forced thereby into sealing engagement with a gasket seat on the sput or on the embossment. This structure includes a relatively rigid gasket seat on the cap or plug. The seal thereby provided makes no provision for "compression set" in the gasket after the seal has been maintained for relatively long periods. This "setting" is particularly prevalent in the synthetic rubbers or elastomers which are widely used at present and which are even necessary where the drum contains petroleum products which actively attack natural rubber.

For instance, current Federal specifications for gasket materials used on 55 gallon drums permit a 40% compression set in a gasket after being compressed for 22 hours at 158° F. The closures for such drums must be able to withstand hydrostatic pressures up to 30 p. s. i. without leakage. The closure should be capable of withstanding up to 50 cycles of temperature fluctuation from −65° F. to 160° F. without leaking or "breathing." Additionally, the gasket material must survive temperature and solvent tests before it is universally acceptable. The synthetic rubbers able to pass such temperature and solvent tests inevitably have the undesirable compression set characteristics mentioned above.

Thus, to maintain an acceptable seal in spite of the compression set qualities of the gaskets, it has been suggested that the closures be modified to incorporate resilient means exerting a continuous resilient pressure on the gaskets.

The U. S. patents to Thomas H. Risk, Nos. 2,417,703 and 2,498,345 are examples of typical attempts to carry out this suggestion. The closures of both of these patents are three piece assemblies comprising a closure plug, a resilient sealing disc, and actuating means all rigidly connected together. In the first patent the connection is by rivets which are objectionable as they are susceptible of leakage therearound. The second patent connects the parts together by spot welding through the three thicknesses of material. This arrangement is objectionable in that it is very difficult to secure a sufficiently good bond when spot welding through three thicknesses of metal. Thus, the hammering to which the actuating means is subjected to open and close the opening soon fractures the welds and causes separation of the parts.

With the foregoing in view, it is an object of the invention to provide an improved closure of the class described and which provides an extremely strong connection between the parts.

A further object is to provide in such a closure, interfitting and interengaging non-circular formations on all parts which are operative to reinforce more conventional connecting means, if any, against the strains, stresses and shocks which are incident to normal usage of the closures.

Other objects and advantages reside in the particular structures of the invention, combination and arrangement of the several parts thereof—all of which will be readily apparent to those skilled in the art upon reference to the attached drawing in connection with the following specification wherein two embodiments of the invention are shown described and claimed.

In the drawing:

Fig. 1 is a perspective view of one form of the invention;

Fig. 2 is a top plan view thereof;

Fig. 3 is a sectional view taken substantially on the plane of the line 3—3 of Fig. 2;

Fig. 4 is a perspective view of a modified form of the invention;

Fig. 5 is a top plan view thereof; and

Fig. 6 is a sectional view taken substantially on the plane of the line 6—6 of Fig. 5.

Referring specifically to the drawing, wherein like reference characters designate like parts in all views, and referring at first to the form of invention of Figs. 1 to 3 inclusive, 10 designates a wall of any suitable metal container having an embossment 11 formed therein about an opening in the wall 10. The upper surface of the embossment is formed with a pair of concentric ribs 12 providing a gasket seat. A flange or sput 13 is rigidly mounted in the embossment 11 in a well known manner and comprises a horizontal flange 14 and an internally threaded vertical neck 15. As so far described, the structure is conventional and forms no part of my invention.

A closure according to this form of the invention comprises a hollow plug 20 which comprises an externally threaded cylindrical side wall 21 for threaded engagement with the neck 15 of the sput 13. The upper edge of the side wall 21 is inwardly directed to provide a top flange 22, the free inner edges of which are preferably defined by straight lines or otherwise to define a non-circular opening or recess 23. In the form illustrated, the recess or opening 23 is hexagonal but could obviously assume other shapes. Thus, in effect, the plug 20 comprises an inverted cup-shaped member having a top wall or flange 22 formed with a non-circular opening or recess therein axially thereof.

A resilient sealing disc 24 is disposed over the plug 20 and includes a marginal portion 25 which is disposed outwardly of the plug wall 21 concentrically thereof. The marginal portion 25 mounts an annular sealing gasket 26 on the undersurface thereof which is located to engage the gasket seat 12 aforesaid. The central portion of the disc 24 is downwardly directed to provide a hollow, non-circular boss 27 which is complementary to the opening or recess 23 and is seated therein. Thus, the disc 24 is rigidly connected to the plug 20 for rotation therewith. To prevent axial withdrawal of the disc 24 from the opening 23, the lower portion of the boss 27 is upset as at 28 to underlie marginal portions of the flange 22. Thus, the disc and plug are rigidly secured together without the use of welds or separate fasteners such as rivets. The hollow boss 27 forms an upwardly directed non-circular recess 35.

To actuate the device there has been provided a substantially rigid actuating member 30 which is in the form of a plate having a marginal portion 31 in upwardly offset relation to the marginal portion 25 of the sealing disc. Lugs or the like 32 are provided on the marginal portion 31 of the disc 30 for engagement with a suitable actuating tool. The central portion of the actuating member 30 is formed with a downwardly directed hollow boss 33 which is non-circular in shape and complementary to and seated in the recess 35 of the boss 27 of the sealing disc 24. To secure the disc 30 against axial withdrawal, the floor 36 thereof is secured to the floor 37 of the boss 27 preferably by spot welds 34.

It is apparent from the foregoing that the three elements of the closure are rigidly secured together against relative rotation by the interengaging non-circular recesses just described. Likewise, it is apparent that no separate securing members are necessary to prevent separation of the parts in axial directions whereby leakage through the device is prevented. Likewise, it is unnecessary to rely upon spot welds in areas subjected to torsional stresses. Clearly, the non-circular character of the interengaging bosses and recesses relieves the spot welds 34 of any torsional strain.

In the form of invention of Figs. 4 to 6, inclusive, the closure includes an inverted cup-like plug 40 which includes an externally threaded cylindrical side wall 41 for threaded engagement with the neck 15 of the sput 13. The top wall 42 is formed with an axially disposed and downwardly directed boss 43 which is non-circular in configuration and the interior of which provides a non-circular recess 43a. In the embodiment shown, the recess 43a of the boss 43 is hexagonal but could obviously assume other shapes. The floor 44 of the boss is formed with an opening 45 therethrough which may be of any suitable shape but preferably is circular as shown.

A resilient sealing disc 50 includes a marginal portion 51 which is disposed concentrically outwardly of the plug 40 in overlying relation to the gasket seat 12. A suitable annular gasket 52 is mounted on the underside of the marginal portion 51. The central portion of the sealing disc 50 is formed with a downwardly directed hollow boss 53 which is complementary to the recess 43a of the boss 43 of the plug 40 and has a close fit therein. The hollow boss 53 forms an upwardly directed non-circular recess 66. The floor 54 of the boss 53 is formed with a downwardly directed hollow cylindrical boss 55 which has a close fit in the opening 45 aforesaid. The boss 55 is secured in the opening 45 against axial withdrawal preferably by having the bottom portion upset marginally as at 56 to underlie free inner marginal portions of the floor 44.

To actuate the devices there has been provided an actuating member 60 which comprises a substantially rigid plate having a marginal portion 61 which overlies the marginal portion 51 of the sealing disc in upwardly offset relation. Suitable tool engaging means such as the lugs 62 are integral with the outer edge of the disc 60. The central portion of the disc 60 is formed with a downwardly directed hollow boss 63 of non-circular shape which is complementary to the shape of the recess 66 of the boss 53 and which has a close fit therein. To prevent withdrawal of the disc 60 in upward direction, the floor 64 thereof is rigidly secured to the sealing disc 50 in any suitable manner as by the annular series of spot welds 65.

It is apparent from the foregoing, that this form of invention also shows the three parts of the closure rigidly secured together by interfitting bosses and recesses or the like which mutually reinforce each other whereby there is virtually no danger of the separation of the parts on account of torsional stresses. Likewise, spot welds 65 are so disposed that they are not subjected to torsional or other stresses incident to normal use of the device. At the same time, both forms of the invention provide resilient sealing discs having marginal portions which are flexed upwardly when the closures are seated so as to impose continuous pressure on the gaskets whereby to overcome compression set therein over long periods and under diversified conditions. Thus, the substantially flat marginal portions 25 and 51 of the resilient sealing discs 24 and 50 are normally in the position indicated in Fig. 6. However, when the closure is tightened down such marginal portions are upwardly flexed as indicated in Fig. 3 whereby continuous resilient pressure is exerted on the gaskets 26 and 52. In this connection, it is understood that the marginal portions 31 and 61 of the actuating members 30 and 60, respectively, are upwardly offset a sufficient distance from the like portions of the sealing discs to permit enough upward flexing of the latter to more than compensate for the maximum allowable compression set for the particular gasket material involved. Hence, this upward offsetting will vary to some extent in accordance with the gasket material contemplated whereby offsetting to a greater or lesser degree than shown in the drawing is contemplated when necessary.

Moreover, it is apparent that the two embodiments illustrated hereinabove are but typical of others which will occur to those skilled in the art. Thus, while I have shown and described what are now thought to be the preferred embodiments of the invention, it should be understood that the same are susceptible of further variations and changes in form and design. Consequently, I do not limit myself to the precise structures shown and described hereinabove except as hereinafter claimed.

I claim:

1. A closure for a container, comprising an inverted cup-shaped plug having an end wall and a screw threaded side wall, said end wall being formed with an upwardly directed non-circular recess, a resilient disc having a central portion formed with a depending non-circular hollow boss providing an upwardly directed non-circular recess, said boss being complementary to said recess of said end wall and being non-rotatably seated therein, said disc having an annular free edge portion disposed concentrically outwardly of said plug, a substantially rigid plug actuating member, said member having a non-circular boss below the same, said last-named boss being complementary to said recess of said disc and being fixedly seated therein, means securing said actuating means to said disc, and separate means securing said disc and plug together.

2. The structure of claim 1, wherein said recess in said end wall of said plug consists of a hole therethrough, said boss on said disc extending below said end wall and being formed with radially outwardly directed portions underlying said end wall to provide said means securing said disc thereto.

3. The structure of claim 1, wherein said recess in said end wall of said plug includes a floor, an axially disposed aperture formed in said floor, a third boss depending from said boss of said disc and extending through said aperture, and said third boss being formed with radially outwardly directed portions underlying said end wall of said plug to provide said means securing said disc thereto.

4. The structure of claim 1, there being a hole formed through said end wall of said plug, said boss on said disc including at least a portion extending through said hole, and said portion of said boss on said disc including radially outwardly directed means extending radially outwardly around said hole below said end wall to provide said means securing said disc and plug together.

5. The structure of claim 4, wherein said radially outwardly directed means comprises an annular flange.

6. The structure of claim 5, wherein said annular flange is of double thickness and comprises an upset portion of said boss of said disc.

7. A closure for a container, comprising an inverted, cup-shaped plug, said plug having an end wall and a screw threaded side wall, said end wall being formed with a noncircular recess, a resilient disc having a central portion formed with a depending hollow non-circular boss complementary to said recess of said end wall and non-rotatably seated therein, said boss providing an upwardly directed non-circular recess, said disc having an annular free edge disposed concentrically outwardly of said plug, a substantially rigid plug actuating member, said actuating member including marginal portions in upwardly offset relation to said marginal portions of said disc to permit upward flexing of said marginal portions of said disc, said member having a non-circular boss below the same, said last-named boss being complementary to said recess of said disc and being fixedly seated therein, means securing said actuating means to said disc and separate means securing said disc and plug together.

8. In a closure of the type subjected to torsional strains to open and close the same and comprising at least upper, lower, and intermediate superimposed elements; the improvement comprising said lower element being formed with an upwardly directed non-circular recess, said intermediate element being formed with a depending hollow boss complementary to said recess and closely fitted therein, said hollow boss providing an upwardly directed non-circular recess, and said upper element having a depending boss thereon complementary to said last-named recess and closely fitted therein.

9. The structure of claim 8, there being means preventing axial separation of said upper element from said intermediate element, and separate interengaged means preventing axial separation of said intermediate element and said lower element.

10. In a closure of the type subjected to torsional strains to open and close the same and comprising at least upper, lower and intermediate superimposed elements; the improvement comprising said lower element being formed with a non-circular hole therethrough, said intermediate element being formed with a depending hollow boss complementary to said hole and closely fitted therein, said hollow boss providing an upwardly directed non-circular recess, and said upper element having a depending boss thereon complementary to said recess and closely fitted therein.

11. The structure of claim 10, wherein said first-named boss includes radially outwardly extending means underlying said lower element around said hole to prevent retraction of such boss from said hole.

12. In a closure of the type subjected to torsional strains to open and close the same and comprising at least upper, lower and intermediate superimposed elements; the improvement comprising said lower element being formed with an upwardly directed non-circular recess, said recess having a floor formed with a hole therethrough, said intermediate element being formed with a depending hollow boss complementary to said recess and closely fitted therein, said hollow boss providing an upwardly directed non-circular recess and having a floor formed with a depending boss complementary to said hole and extending therethrough, means preventing retraction of said last-named boss from said hole, and said upper element having a depending boss thereon complementary to said last-named recess and closely fitted therein.

13. In a closure of the type subjected to torsional strains to open and close the same and comprising upper, lower and intermediate superimposed elements; the improvement comprising said lower element being formed with an upwardly directed non-circular recess, said recess having a floor formed with a hole therethrough, said intermediate element being formed with a depending hollow boss complementary to said recess and closely fitted therein, said hollow boss providing an upwardly directed non-circular recess and having a floor formed with a depending boss complementary to said hole and extending therethrough, said last-named boss including radially outwardly directed portions underlying said floor which comprise means preventing retraction of said last-named boss from said hole, and said upper element having a depending boss thereon complementary to said last-named recess and closely fitted therein.

References Cited in the file of this patent

UNITED STATES PATENTS

| | | |
|---|---|---|
| 1,010,285 | Mackin | Nov. 28, 1911 |
| 1,690,804 | Wikstrom | Nov. 6, 1928 |
| 2,417,703 | Risk | Mar. 18, 1947 |
| 2,468,757 | Johnson | May 3, 1949 |
| 2,498,345 | Risk | Feb. 21, 1950 |
| 2,529,424 | Seigh | Nov. 7, 1950 |
| 2,616,585 | Condit et al. | Nov. 4, 1952 |
| 2,634,882 | Wittenberg | Apr. 14, 1953 |